United States Patent
Lum et al.

(10) Patent No.: US 9,947,084 B2
(45) Date of Patent: Apr. 17, 2018

(54) MULTIRESOLUTION CONSISTENT RASTERIZATION

(71) Applicant: NVIDIA Corporation, Santa Clara, CA (US)

(72) Inventors: Eric B. Lum, San Jose, CA (US); John S. Montrym, Los Altos Hills, CA (US); Walter R. Steiner, Flagler Beach, FL (US); Justin Cobb, Toney, AL (US); Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 392 days.

(21) Appl. No.: 13/790,037

(22) Filed: Mar. 8, 2013

(65) Prior Publication Data

US 2014/0253555 A1 Sep. 11, 2014

(51) Int. Cl.
*G06T 5/00* (2006.01)
*G06T 15/00* (2011.01)

(52) U.S. Cl.
CPC ............ *G06T 5/006* (2013.01); *G06T 15/005* (2013.01)

(58) Field of Classification Search
CPC ...................................................... G09G 5/391
USPC ................................................. 345/419, 428
See application file for complete search history.

(56) References Cited

U.S. PATENT DOCUMENTS

| | | | |
|---|---|---|---|
| 5,815,168 A | 9/1998 | May | |
| 7,436,405 B2* | 10/2008 | Losasso Petterson | G06T 15/10 345/423 |
| 8,068,117 B2* | 11/2011 | Lefebvre | G06T 11/001 345/582 |
| 8,891,886 B2* | 11/2014 | Nystad | 382/232 |
| 9,218,689 B1* | 12/2015 | Baldwin | G06T 15/503 |
| 2005/0253843 A1* | 11/2005 | Losasso Petterson et al. | 345/428 |

(Continued)

FOREIGN PATENT DOCUMENTS

| | | |
|---|---|---|
| CN | 1722179 A | 1/2006 |
| CN | 101072353 A | 11/2007 |
| TW | 201019262 A | 5/2010 |

OTHER PUBLICATIONS

Sun et al. "Universal Rasterizer with Edge Equations and Tile-scan Triangle Traversal Algorithm for Gaphics Processing Units". IEEE 2009.*

(Continued)

*Primary Examiner* — Kimbinh T Nguyen
(74) *Attorney, Agent, or Firm* — Artegis Law Group, LLP

(57) ABSTRACT

A technique for multiresolution consistent rasterization in which a setup unit calculates universal edge equations for a universal resolution. A rasterizer evaluates coverage data for two different resolutions based on the edge equations. The rasterizer evaluates coverage data for different effective pixel sizes—a large pixel size and a small pixel size. Optionally, the rasterizer may determine a first set of coverage data by performing conservative rasterization to determine coverage data for large pixels. Optionally, the rasterizer may then determine a second set of coverage data by performing standard rasterization for small pixels. Optionally, for the second set of coverage data, the rasterizer may evaluate only the small pixels that are within large pixels in the first set of coverage data that evaluate as covered.

23 Claims, 10 Drawing Sheets

(56) References Cited

U.S. PATENT DOCUMENTS

2008/0024497 A1    1/2008   Crow et al.
2011/0081100 A1    4/2011   Lindholm et al.

OTHER PUBLICATIONS

Lemoine et al. "Rasterization by Multiresolution Integration", IEEE 2010.*
Dick et al. "GPU-Aware Hybrid Terrain Rendering", published 2011.*
IBM "Arithmetic Shift", IBM, 2005.*
Lloyd, D.B. et al.: Practical logarithmic rasterization for low-error shadow maps. Graphics Hardware, 2007, im Internet am Jun. 13, 2010 abrufbar under http://web.archive.org/web/20100615000000*/http://gamma.cs.unc.edu/LOGPSM/logRasterization.pdf, [abgerufen am Sep. 22, 2014].
Online-Enzyklopädie "Wikipedia", Artikel vom Feb. 27, 2013 zum Begriff "Arithmetic shift", [recherchiert am Nov. 17, 2014].

\* cited by examiner

CONCEPTUAL DIAGRAM

MULTIRESOLUTION CONSISTENT RASTERIZATION

BACKGROUND OF THE INVENTION

Field of the Invention

The present invention generally relates to three-dimensional (3D) graphics processing, and, more particularly, to multiresolution consistent rasterization.

Description of the Related Art

A graphics processing pipeline converts input graphics data that is typically associated with three-dimensional objects into pixel data that is associated with a two-dimensional surface. In conventional implementations, a world-space portion of the graphics processing pipeline is responsible for processing the input graphics data, which is usually composed of a collection of triangles and related vertices, prior to when the data is converted into pixel data. A screen-space portion of the graphics processing pipeline is responsible for processing the converted pixel data and generating final pixel values for display.

One of the stages in the graphics processing pipeline is the rasterization stage, which typically involves converting the graphics data processed by the world-space portion of the pipeline into pixel data. Rasterization may involve generating edge equations that describe the edges of triangles processed in the world-space portion of the pipeline, determining coverage information for those triangles, and computing attribute values for the pixels and fragments covered by the triangles. The calculations involved in rasterization are generally fixed point calculations that are normally performed with a fixed fractional-pixel precision. Thus, the results of fixed point rasterization calculations can be thought of as "snapped" to a grid, where the boxes of the grid correspond to boxes of fractional-pixel size.

In many implementations, a graphics processing pipeline may rasterize the same three-dimensional object at different resolutions. For example, a triangle may first be rasterized at a low resolution to make certain determinations about the triangle, such as what general portions of a surface are covered by the triangle. The triangle may subsequently be rasterized at a higher resolution to generate image data for display. However, rasterization conducted at a lower resolution generally provides results that are "snapped" to a coarser grid than rasterization conducted at a higher resolution. Therefore, lower resolution rasterization may produce coverage results that do not properly align with the coverage results of higher resolution rasterization. For example, if memory is allocated based on the results of low resolution rasterization, memory may be over-allocated or under-allocated due to the fact that the results of lower-resolution rasterization are snapped to a coarser grid. More specifically, memory may be allocated for blocks for which no allocation is necessary, or memory may fail to be allocated for blocks for which allocation is in fact necessary.

As the foregoing illustrates, what is needed in the art is a more effective way to rasterize graphics data at different resolutions.

SUMMARY OF THE INVENTION

One embodiment of the present invention sets forth a method for rasterizing an object. The method includes determining a universal resolution that corresponds to a universal grid. The method further includes calculating universal edge equations based on the universal resolution and data that represent geometry data associated with the object. The method further includes determining large pixel coverage data comprising a plurality of covered large pixels based on the universal edge equations and a first resolution.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing device configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
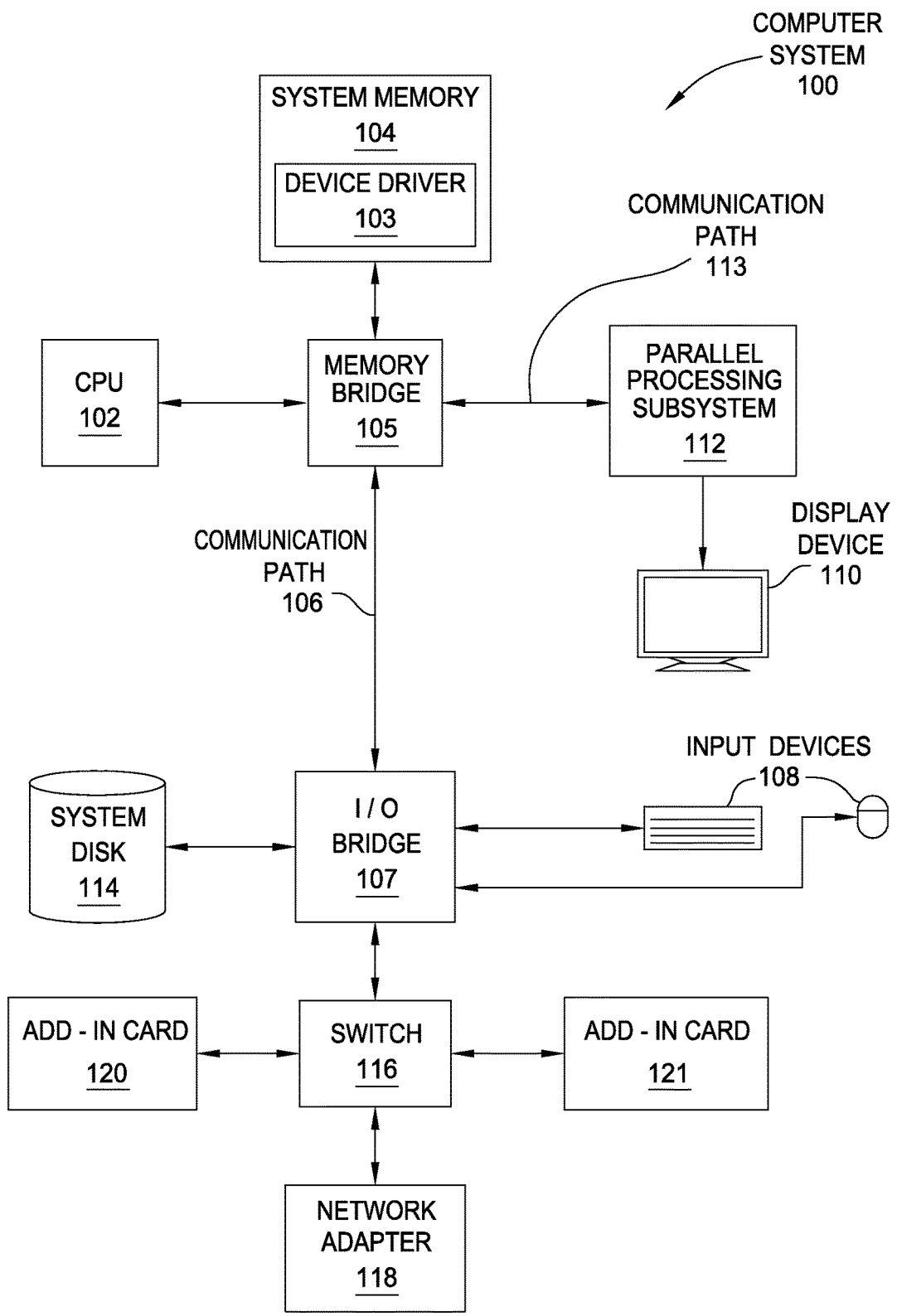
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
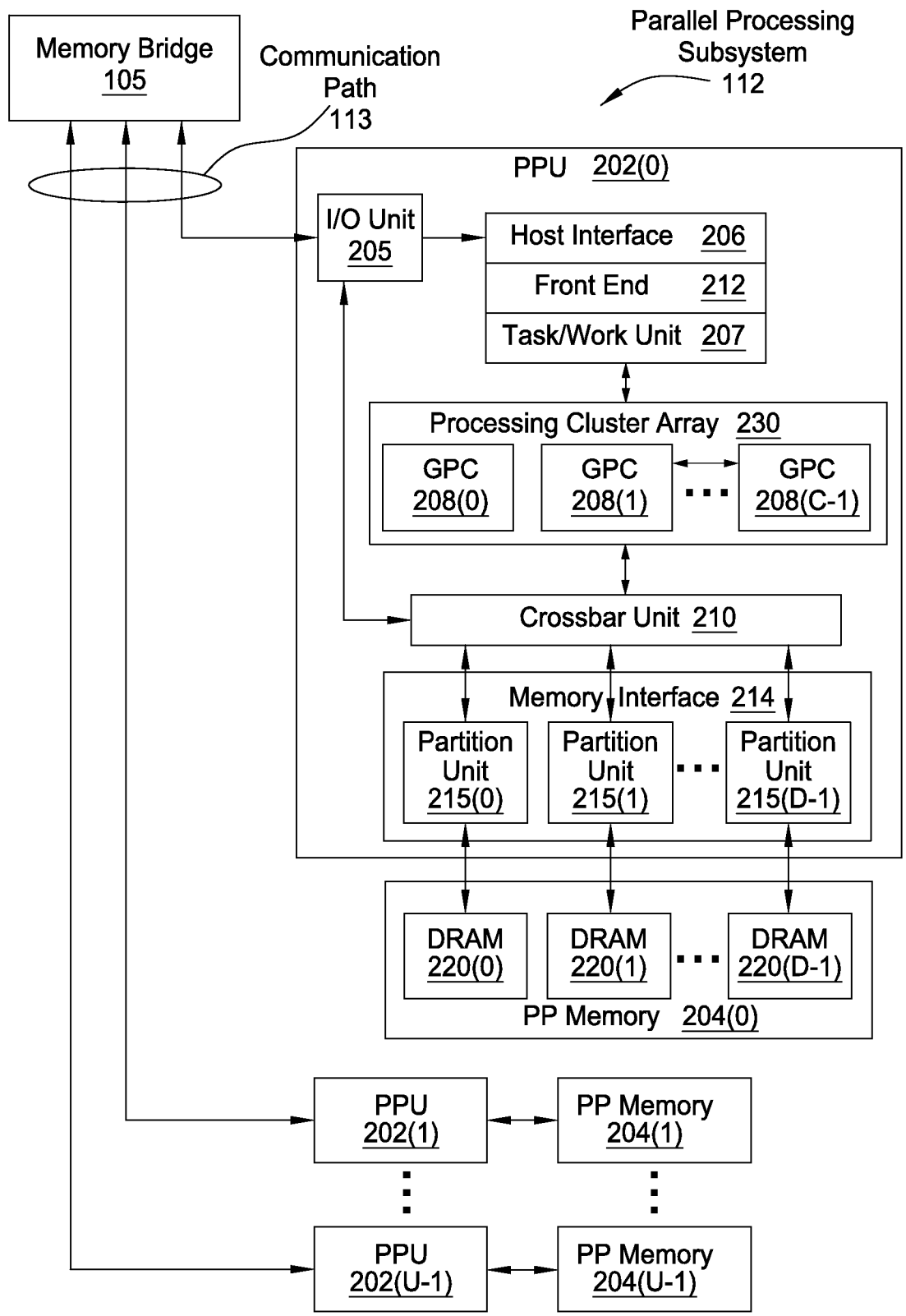
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
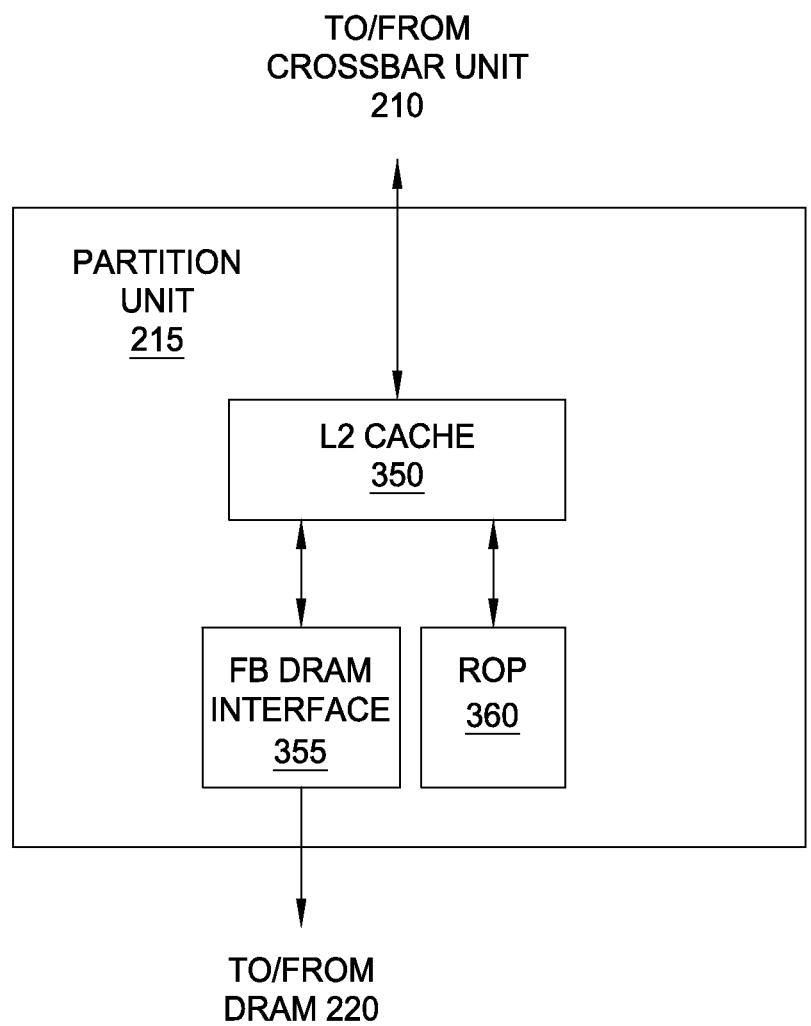
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
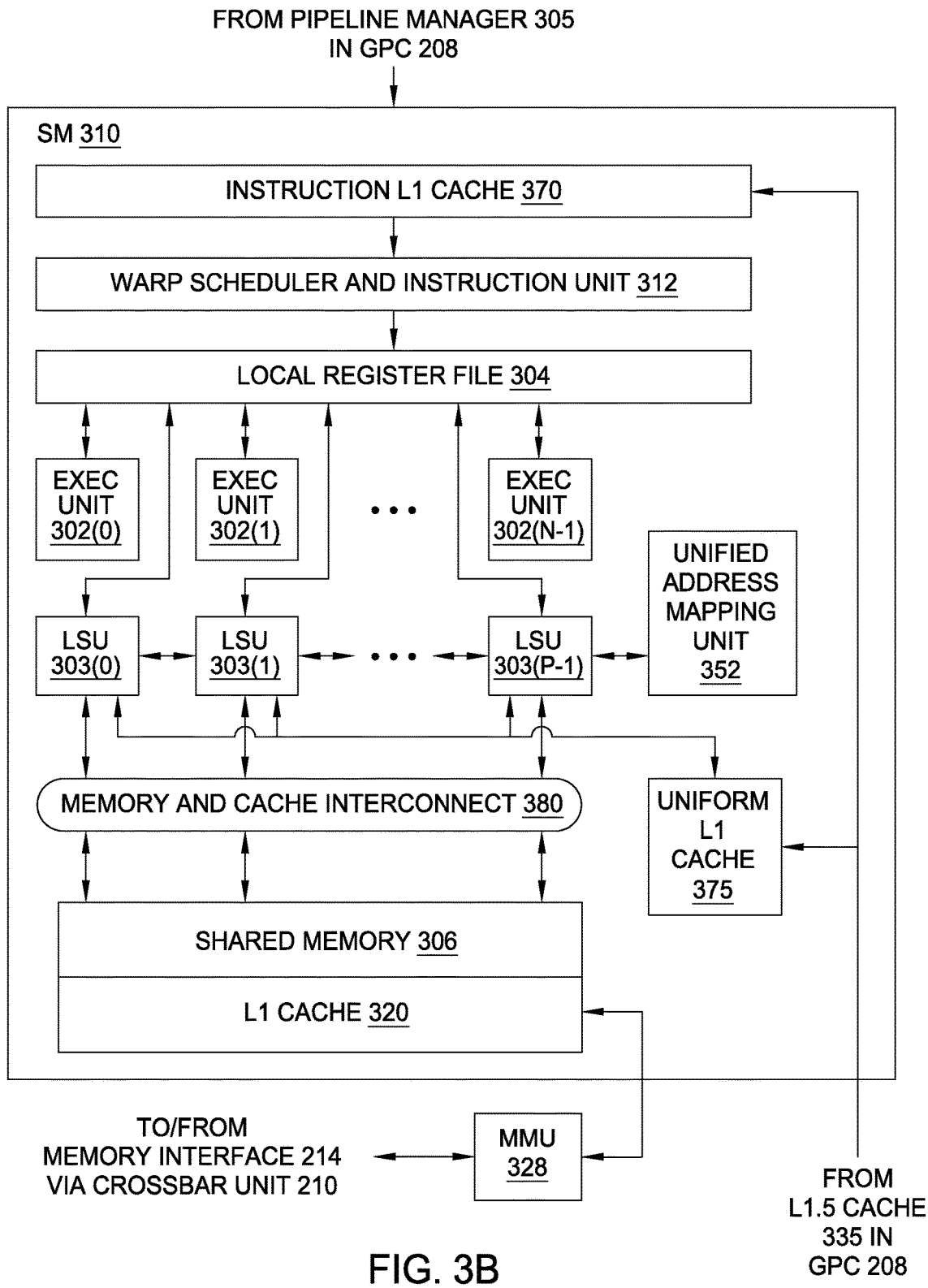
FIG. 3B is a block diagram of a portion of a streaming multiprocessor (SM) that resides within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
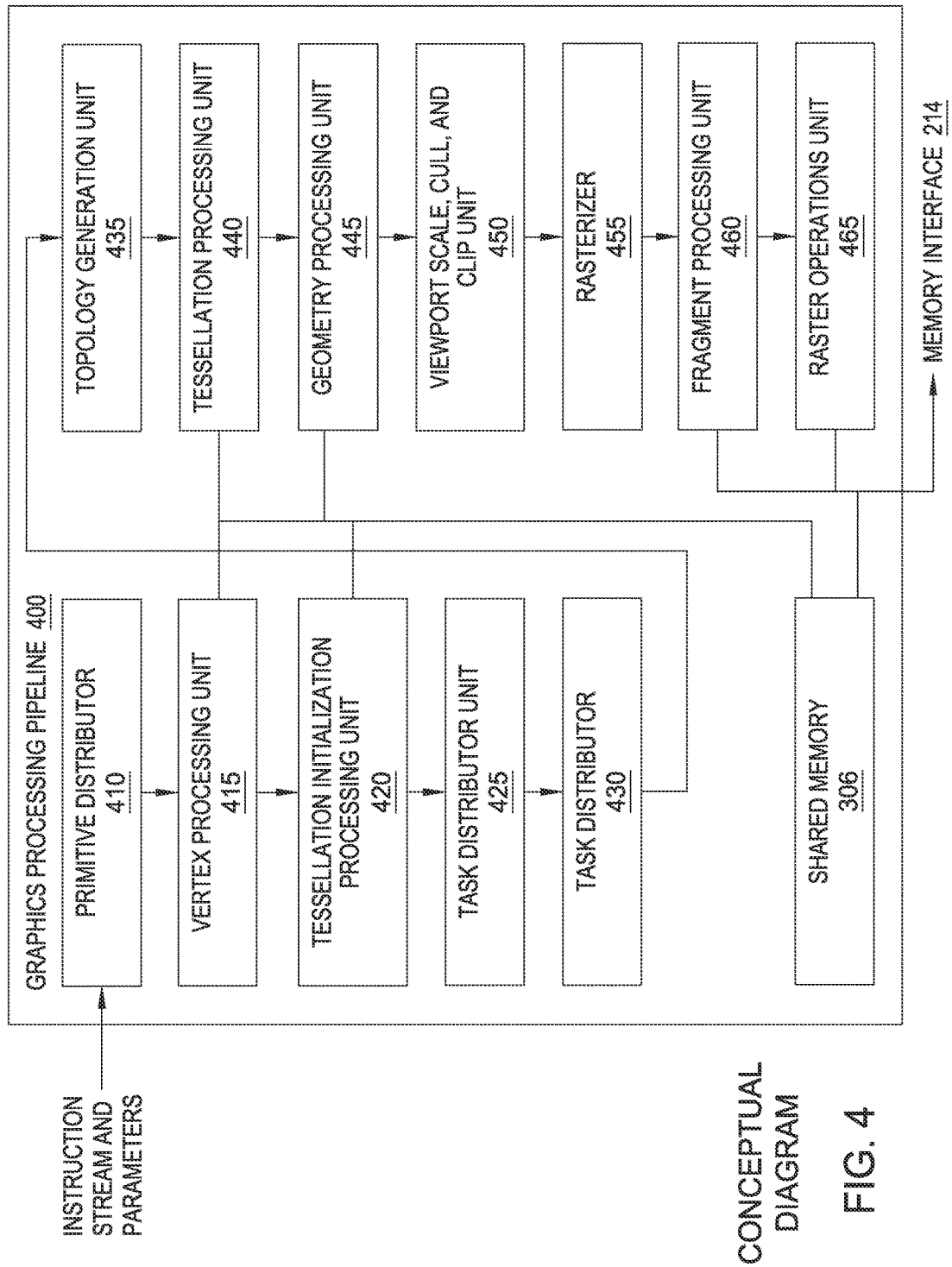
FIG. 4 is a conceptual diagram of a graphics processing pipeline that one or more of the general processing clusters (GPCs) of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a tessellation initialization processing unit 420, a tessellation processing unit 440, a geometry processing unit 445, and a fragment processing unit 460. The functions of primitive distributor 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215. Alternately, graphics processing pipeline 400 may be implemented using dedicated processing units for one or more functions.

The graphics processing pipeline 400 also includes a local memory that is shared among the graphics processing pipelines 400. For example, the graphics processing pipeline could use the shared memory 306 within the SM 310 as such a local memory. As further described below, inter-stage buffers (not shown) within the shared memory 306 are allocated and deallocated by the various processing units in the graphics processing pipeline 400 as needed. A processing unit reads input data from one or more inter-stage buffers, processes the input data to produce output data, and stores the resulting output data in one or more inter-stage buffers. A subsequent processing unit may read this resulting output data as input data for the subsequent processing unit. The subsequent processing unit processes the data and stores output data in one or more inter-stage buffers, and so on. The shared memory 306 and various other stages of the graphics processing pipeline connect with external memory via the memory interface 214.

The primitive distributor 410 processing unit collects vertex data for high-order surfaces, primitives, and the like, and outputs the vertex data, including the vertex attributes, to vertex processing unit 415. In some embodiments, the primitive distributor 410 includes a vertex attribute fetch unit (not shown) that retrieves the vertex attributes and stores the vertex attributes in the shared memory 306. The vertex processing unit 415 is a programmable execution unit that is configured to execute vertex shader programs, lighting and transforming vertex data as specified by the vertex shader programs. For example, the vertex processing unit 415 may be programmed to transform the vertex data from an object-based coordinate representation (object space) to an alternatively based coordinate system such as world space or normalized device coordinates (NDC) space. The vertex processing unit 415 may read data that is stored in shared memory 306, L1 cache 320, parallel processing memory 204, or system memory 104 by primitive distributor 410 for use in processing the vertex data. The vertex processing unit 415 stores processed vertices in the inter-stage buffers within the shared memory 306.

The tessellation initialization processing unit 420 is a programmable execution unit that is configured to execute tessellation initialization shader programs. The tessellation initialization processing unit 420 processes vertices produced by the vertex processing unit 415 and generates graphics primitives known as patches. The tessellation initialization processing unit 420 also generates various patch attributes. The tessellation initialization processing unit 420 then stores the patch data and patch attributes in the inter-stage buffers within the shared memory 306. In some embodiments, the tessellation initialization shader program may be called a hull shader or a tessellation control shader.

The task generation unit 425 retrieves data and attributes for vertices and patches from the inter-stage buffers of the shared memory 306. The task generation unit 425 generates tasks for processing the vertices and patches for processing by later stages in the graphics processing pipeline 400.

The task distributor 430 redistributes the tasks produced by the task generation unit 425. The tasks produced by the various instances of the vertex shader program and the tessellation initialization program may vary significantly between one graphics processing pipeline 400 and another. The task distributor 430 redistributes these tasks such that each graphics processing pipeline 400 has approximately the same workload during later pipeline stages.

The topology generation unit 435 retrieves tasks distributed by the task distributor 430. The topology generation unit 435 indexes the vertices, including vertices associated with patches, and computes texture coordinates corresponding to the vertices. The topology generation unit 435 then stores the indexed vertices in the inter-stage buffers within the shared memory 306.

The tessellation processing unit 440 is a programmable execution unit that is configured to execute tessellation shader programs. The tessellation processing unit 440 reads input data from and writes output data to the inter-stage buffers of the shared memory 306. This output data in the inter-stage buffers is passed to the next shader stage, the geometry processing unit 445 as input data. In some embodiments, the tessellation shader program may be called a domain shader or a tessellation evaluation shader.

The geometry processing unit 445 is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit 445 may be programmed to subdivide the graphics primitives into one or more new graphics primitives and calculate parameters, such as plane equation coefficients, that are used to rasterize the new graphics primitives.

In some embodiments, the geometry processing unit 445 may also add or delete elements in the geometry stream. The geometry processing unit 445 outputs the parameters and vertices specifying new graphics primitives to a viewport scale, cull, and clip unit 450. The geometry processing unit 445 may read data that is stored in shared memory 306, parallel processing memory 204 or system memory 104 for use in processing the geometry data. The viewport scale, cull, and clip unit 450 performs clipping, culling, and viewport scaling and outputs processed graphics primitives to a rasterizer 455.

The rasterizer 455 scan converts the new graphics primitives and outputs fragments and coverage data to fragment processing unit 460. Additionally, the rasterizer 455 may be configured to perform z culling and other z-based optimizations.

The fragment processing unit 460 is a programmable execution unit that is configured to execute fragment shader programs, transforming fragments received from the rasterizer 455, as specified by the fragment shader programs. For example, the fragment processing unit 460 may be programmed to perform operations such as perspective correction, texture mapping, shading, blending, and the like, to produce shaded fragments that are output to raster operations unit 465. The fragment processing unit 460 may read data that is stored in shared memory 306, parallel processing memory 204 or system memory 104 for use in processing the fragment data. Fragments may be shaded at pixel, sample, or other granularity, depending on the programmed sampling rate.

The raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory. In various embodiments, the ROP 465 may be located in the memory interface 214, in the GPCs 208, in the processing cluster array 230 outside of the GPCs, or in a separate unit (not shown) within the PPUs 202.

Viewport Transforms and Rasterization

Still referring to FIG. 4, oftentimes, graphical objects are rasterized at two different resolutions. For example, to determine memory allocation for standard rasterization at a "normal" resolution, rasterizer 455 may first rasterize an object at a "lower" resolution to determine memory allocation, and subsequently rasterize the object at the normal resolution. To rasterize an object at two different resolutions, two different sets of specific parameters related to the two different resolutions are set in several units in the graphics processing pipeline 400, and the same object is rasterized twice—once for each set of parameters, and thus for each resolution. Some units in the graphics processing pipeline 400 for which parameters are set include the rasterizer 455, and units upstream from the rasterizer 455, including viewport scale, cull, and clip unit 450. The operation of the rasterizer 455 and the upstream units for rasterizing an object at two different resolutions is described in greater detail below.

The viewport scale, cull, and clip unit 450 receives geometric data related to an object from units upstream to the viewport scale, cull, and clip unit 450. The viewport scale, cull, and clip unit 450 executes a viewport transform on the geometric data, to produce coordinates for the vertices of the object in two-dimensional screen-space. The viewport transformation specifies a certain resolution that generally corresponds to a two-dimensional grid or space. The coordinates of the vertices of the object in the two-dimensional space have values that correspond to this resolution. Thus, for a resolution of 320×240, horizontal coordinates for vertices of an object can range from 0 to 320, and vertical coordinates can range from 0 to 240. For other resolutions, coordinates can have different ranges.

Conceptually, coordinates in a first resolution can be mapped to coordinates in a second resolution by scaling the coordinates in the first resolution up or down to produce corresponding coordinates in the second resolution. For example, for a first resolution of 320×240, a set of coordinates of 10, 5 can be mapped to a resolution of 640×480 by scaling up the coordinates by a factor of two, such that the new coordinates are 20, 10. Coordinates that map in this manner are referred to herein as having the same "logical position" across two different resolutions.

Calculations for the viewport transform typically include some rounding. That is, coordinates that result from the viewport transform have a certain amount of rounding applied, meaning that the results of the calculations for generating the screen-space vertices are rounded to a certain precision. The viewport transform also "snaps" coordinates for the object vertices to a specified sub-pixel grid. In other words, the screen-space positions for the vertices of the object that has had a viewport transform applied are aligned with a grid, where the cells (or "sub-pixels") of the grid have a size equal to a specified fraction of a pixel (for example, all cells in the grid may have a size equal to $\frac{1}{4}^{th}$ or $\frac{1}{64}^{th}$ of a pixel). The "snapping" causes the coordinates of an object to be aligned with these fractional-pixel sized sub-pixels. The results of the viewport transform include the effects of the snapping and rounding and generally include screen-space coordinates for each vertex of each object, aligned to the sub-pixel grid.

The rasterizer 455 receives the screen-space coordinates for vertices of an object from the viewport scale, cull, and clip unit 450. Rasterizer 455 includes a setup unit that calculates edge equations for the object. Rasterizer 455 takes primitives and edge equations from the setup unit and evaluates the edge equations provided by the setup unit to determine coverage of samples or pixels for the object. The edge equations are typically in the form $E(x,y)=Ax+By+C$, where A, B, and C are coefficients calculated by setup unit, x and y are coordinates of a pixel or sample to be evaluated by the edge equations, and $E(x,y)$ represents the result of evaluating the edge equation for one set of x-y coordinates. Because the x and y coordinates are dependent on the resolution specified during the viewport transform, the coefficients of the edge equations are traditionally different for rasterization at different resolutions.

Traditional Multi-Resolution Rasterization

In a traditional approach, an object is rasterized at two different resolutions by applying a viewport transform for an object at the two different resolutions, calculating corresponding edge equations for the two different resolutions, and rasterizing the object at two different resolutions. The first viewport transform produces two-dimensional screen-space coordinates for the vertices of the object at the first resolution and the second viewport transform produces two-dimensional screen-space coordinates for the vertices of the object at the second resolution. The positions of the vertices for an object that is rasterized at the two different resolutions are in approximately the same "logical position" across the two different resolutions, although as described below, vertices for an object that are rasterized at two different resolutions do not necessarily occupy exactly the same logical position.

However, one drawback of this traditional approach is that applying the viewport transform for two different resolutions means that vertex positions at the two different resolutions may not be in the same logical position due to the effects of rounding. An additional drawback of the traditional approach is that applying the viewport transform for two different resolutions causes the coordinates for the vertices of the object to be "snapped" to two different grids, since the fixed fractional pixel size is different for two different resolutions. This "snapping" to two different resolutions means that vertices for an object at the first resolution are not necessarily in the same "logical" position as vertices for an object at the second resolution. This inconsistency can cause rasterization for the first resolution to produce rasterization results that are inconsistent in terms of coordinate positions, and can lead to inaccuracies in the application of the results. For example, if memory is allocated based on the results of a low resolution rasterization, memory may be allocated for incorrect portions of a render target due to the inconsistency in rasterization.

Multiresolution Consistent Rasterization

Due to the issues with the traditional approach described above, graphics processing pipeline 400 can be configured to operate in a "multiresolution consistent rasterization mode." In such a mode, an instruction is sent into the graphics processing pipeline 400 to rasterize an object at two different resolutions (a "low" resolution and a "high" resolution) using the multiresolution consistent rasterization mode. The object is processed normally by units upstream of viewport scale, cull, and clip unit 450, but only one viewport transform is applied to the object, and this viewport transform produces screen-space coordinates for the vertices of the object at a "universal" resolution, instead of at two different resolutions. In one embodiment, the universal resolution is a lowest common multiple resolution of the low and high resolutions for which the object is rasterized. The result of the viewport transform to the universal resolution is a set of coordinates for the object that indicates the object's vertex positions on a universal grid that corresponds to the universal resolution. The universal grid has universal pixels, and a "sub-pixel grid", where the sizes of the sub-pixels in the sub-pixel grid are fractional sized portions of the universal pixels.

In the multi-resolution consistent rasterization mode, setup calculates edge equations for the object in the universal resolution. Because there is only one resolution, only one set of edge equations is calculated for the object. Subsequently, rasterizer 455 evaluates the edge equations for the object twice (a "first evaluation" and a "second evaluation")—i.e., once for each of two resolutions. Evaluation at the two resolutions includes evaluating based on different "effective pixel sizes," (such as "large pixels" and "small pixels") where each effective pixel size includes one or more of the universal pixels in the universal grid. In some embodiments, evaluation at the two resolutions also includes evaluating based on different evaluation criteria, such as standard rasterization or conservative rasterization.

In the first evaluation, corresponding to the lower resolution, rasterizer 455 evaluates the edge equations based on a first set of evaluation criteria, and at the first resolution. Evaluating the edge equations at the first resolution includes evaluating the edge equations for each "large pixel" in a set of large pixels. "Large pixels" are simply large collections of universal pixels. In other words, each large pixel includes a large number of the universal pixels. In one embodiment, the first set of evaluation criteria is conservative rasterization. In conservative rasterization, a pixel or sample evaluates as covered if an object touches any portion of the pixel or sample. Thus, for the large pixels, conservative rasterization evaluates as covered if the object touches any portion of the large pixel.

In some embodiments, the results of the first evaluation are stored in a memory location. The memory address for a particular result of the first evaluation is based on the coordinates of the large pixels. More specifically, the memory address for each large pixel corresponds to "large pixel positions" of each "large pixel" in the universal grid. Each large pixel has a large pixel position that corresponds to the numerically lowest position in both x and y coordinates in the universal grid of the large pixel. For example, if a large pixel spans universal pixel numbers 32-63 horizontally, and 32-63 vertically, then the large pixel position of the large pixel is 32, 32. To determine the memory address for storage of the results of the first evaluation, the large pixel position for each large pixel is divided by a scaling factor. The scaling factor is the ratio of the size of a large pixel to the unit size of the universal grid. The "unit size" is the size of fractional sub-pixel in the sub-pixel grid (e.g., if the universal grid has sub-pixels that are one quarter the size of the universal pixels, then the unit size is equal to one quarter the size of the universal pixels). As an example, a large pixel may have a large pixel size of 32 by 32 unit sizes. The scaling factor is thus 32. In this example, to determine a memory address for storage of the results of the first evaluation, the pixel position for each large pixel is divided by the scaling factor. Therefore, for a large pixel that spans sub-pixel numbers 32-63 horizontally, and 32-63 vertically, giving the large pixel a large pixel position of 32, 32, the memory address would be 32/32, 32/32=1, 1.

In the second evaluation, corresponding to the higher resolution, rasterizer 455 evaluates the edge equations based on a second set of evaluation criteria, and the second resolution. Evaluating the edge equations at the second resolution includes evaluating the edge equations for each "small pixel" in a set of small pixels. "Small pixels" are simply collections of one or more universal pixels where the small pixel has fewer universal pixels than the large pixels. In other words, each small pixel contains a smaller number of the universal pixels than each large pixel. For example, while a large pixel may include 32 by 32 universal pixels, a small pixel may include only 4 by 4 universal pixels. In one embodiment, the second set of evaluation criteria is standard rasterization. In standard rasterization, rasterizer 455 evaluates the edge equations to determine sample coverage for each of the small pixels, where there may be one or more samples per small pixel.

In one embodiment, rasterizer 455 only evaluates coverage for small pixels that fall within the large pixels that evaluate as covered based on the results of conservative rasterization. To determine the positions in the universal grid for small pixels that fall within the large pixels that evaluate as covered based on the results of conservative rasterization, rasterizer 455 multiplies the memory address for the storage of coverage data for each covered large pixel by the scaling factor, and adds an offset, where the offset is different for each small pixel that lies within the large pixels. For example, if a memory address for a large pixel is 4, 3, the rasterizer 455 multiples the memory address by a scaling factor, such as 8, to arrive at a scaled memory address equal to a position in the universal grid for evaluation of small pixels of 32, 24. Then, the rasterizer 455 evaluates each small pixel within the large pixel. Each small pixel in a large pixel can be evaluated by adding an offset to the scaled memory address.

In some embodiments, the scaling factor is a power of two. In some embodiments, the ratio between the small pixel size and the universal pixel size is a power of two. A power of two ratio allows multiplying and dividing to be done using bit shifting operations, which typically consumes less processing power than multiplication or division by an arbitrarily large number.

The results of the first evaluation and second evaluation are provided by rasterizer 455 to downstream units for further processing.

In some embodiments, rasterizer 455 may evaluate only one set of evaluation criteria for only one pixel size—a "large pixel size." In such a case, no distinction needs to be made between large and small pixels, as there is only one pixel size. However for clarity, the term "large pixel size" is used when rasterizer 455 evaluates only one set of evaluation criteria for one pixel size. In such embodiments, rasterizer 455 determines a large pixel size, which can be any multiple of a unit size, and rasterizer 455 evaluates a set of evaluation criteria as described above. No additional evaluation is done for a second pixel size.

In some embodiments, the large pixel size or small pixel size may comprise a different number of unit sizes in the horizontal and vertical directions. (I.e., the large and/or small pixels may be "rectangular").

Examples of Multi-Resolution Consistent Rasterization

Figure 5:
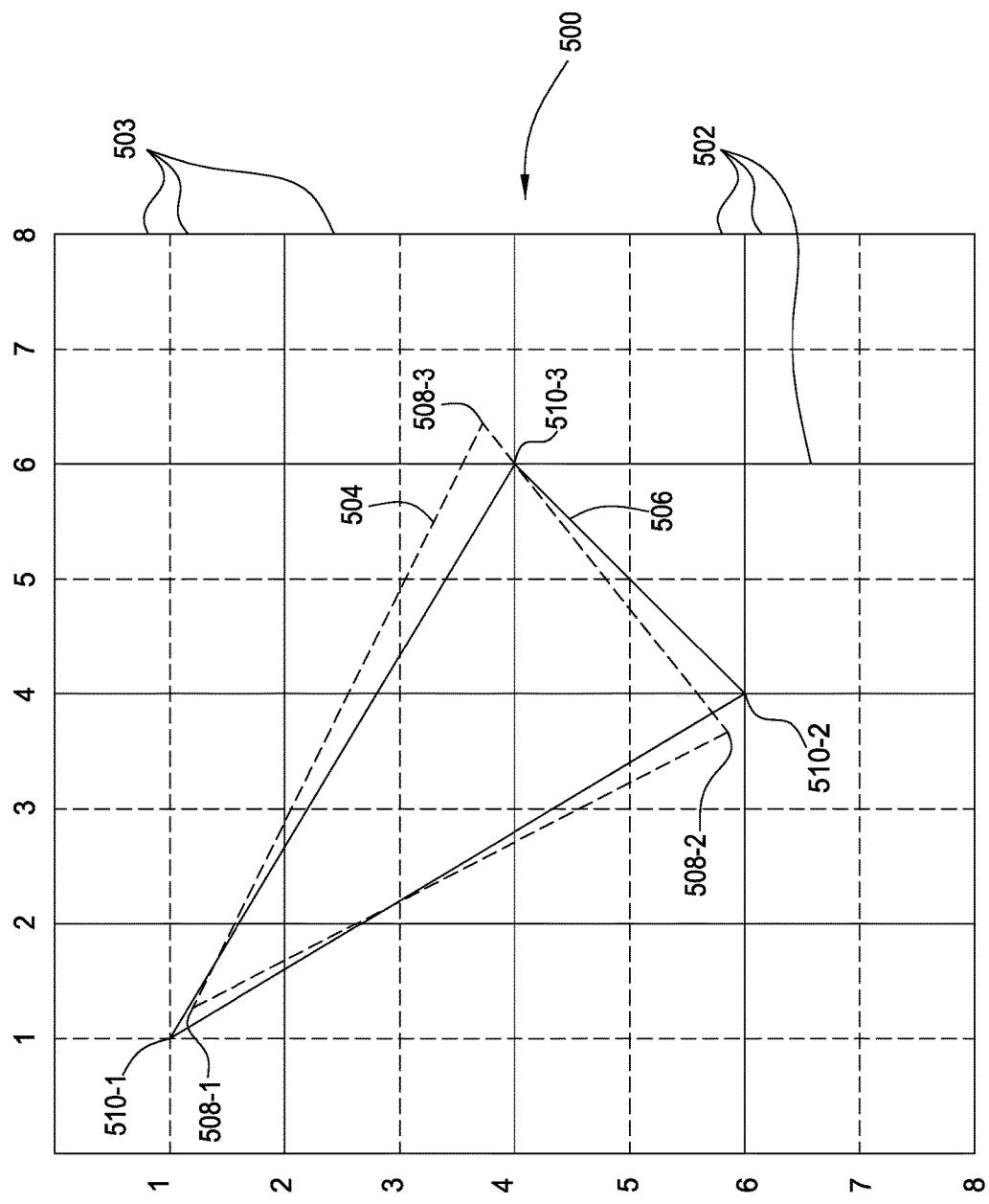
FIG. 5 illustrates an example of an unsnapped primitive and a snapped primitive in a low-resolution region, according to one embodiment of the present invention.

FIG. 5 illustrates an example of an unsnapped primitive 504 and a snapped primitive 506 in a low-resolution region 500, according to one embodiment of the present invention. As shown, the region 500 includes pixels 502, sub-pixels 503, an unsnapped primitive 504, having unsnapped vertices 508, and a snapped primitive 506, having snapped vertices 510.

Region 500 is a region in which an object is rasterized at a first resolution (the first resolution is a "low" resolution, compared to the resolution shown in FIGS. 6A-6C, discussed below). The pixels 502 shown in region 500 are defined by the solid lines, while the sub-pixels 503 are defined by dotted lines. As can be seen by the grid labels to the left and above region 500, the pixels 502 in region 500 have pixel locations (left-most and upper-most coordinates) of 0,0 0,2 0,4 0,6 2,0 2,2 2,4, and so on, while the sub-pixels have sub-pixel locations of 0,0 0,1 0,2 0,3 0,4 0,5 0,6 1,0 1,1, and so on.

Unsnapped primitive 504 is defined by vertices 508-1, 508-2, and 508-3, calculated by units upstream from rasterizer 455. Vertex 508-1 has a position of 1.3, 1.2, vertex 508-2 has a position of 3.7, 5.9, and vertex 508-3 has a position of 6.3, 3.7. When the viewport transform is applied, unsnapped primitive 504 is snapped to form snapped primitive 506. More specifically, the vertices 508 of unsnapped primitive 504 are snapped to the sub-pixels 503 of the grid.

Snapped primitive 506 is defined by vertices 510-1, 510-2, and 510-3. Vertex 510-1 has a position of 1,1, vertex 510-2 has a position of 4,6, and vertex 510-3 has a position of 6,4. As can be seen, "snapping" causes vertices 508 to be snapped such that the positions of snapped vertices 510 are the sub-pixel grid position nearest to the positions of unsnapped vertices 508. (For example, position 1.3,1.2 snaps to 1,1, 3.7,5.9 snaps to 4,6, and so on).

Figure 6A:
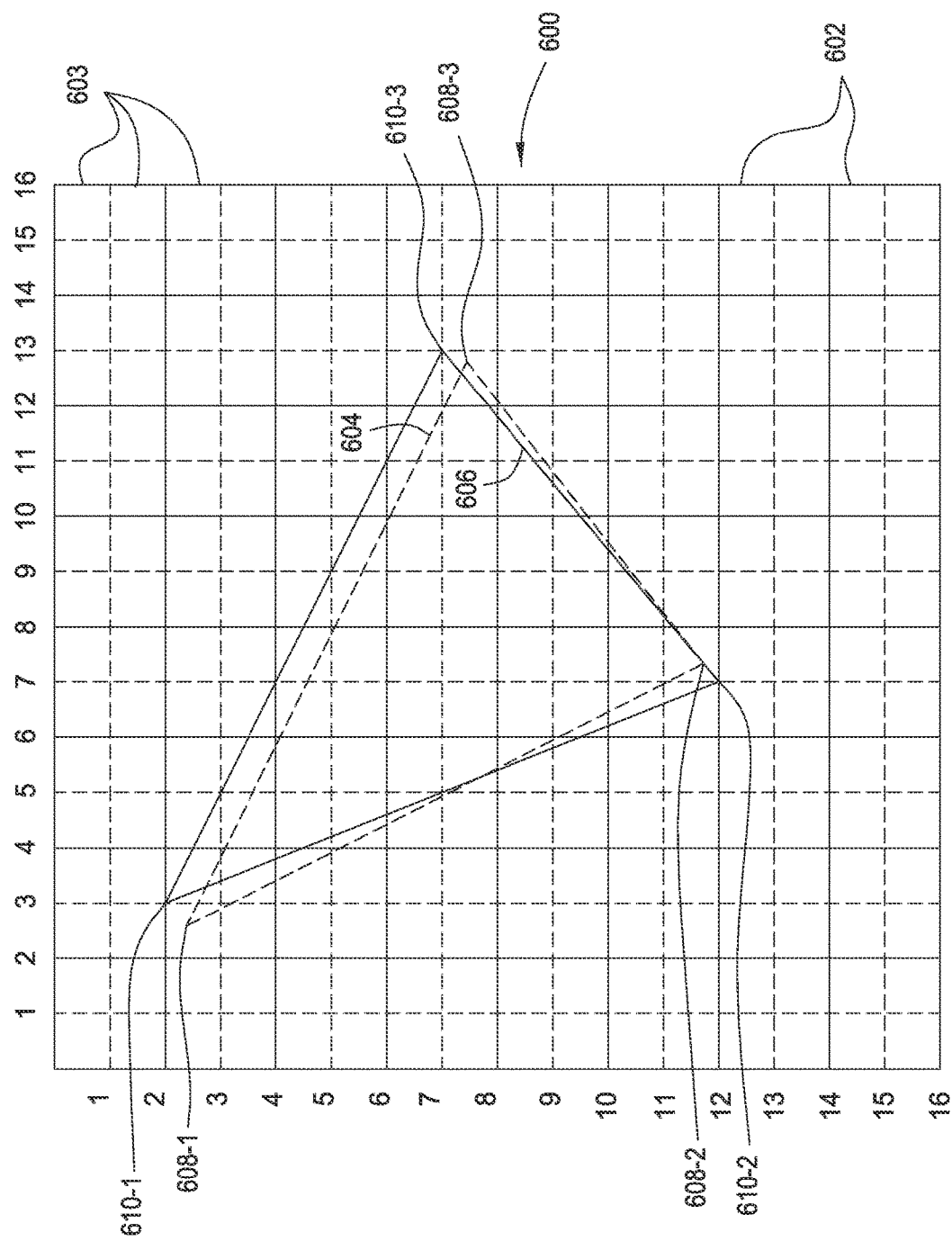
FIG. 6A illustrates an example of an unsnapped primitive and a snapped primitive in a high-resolution region, according to one embodiment of the present invention.

FIG. 6A illustrates an example of an unsnapped primitive 604 and a snapped primitive 606 in a high-resolution region 600, according to one embodiment of the present invention.

As shown, the region 600 includes pixels 602, sub-pixels 603, an unsnapped primitive 604, having unsnapped vertices 608, and a snapped primitive 606, having snapped vertices 610.

Region 600 is a region in which an object is rasterized at a second resolution (the second resolution is a "higher" resolution, compared to the first resolution shown in FIG. 5). The pixels 602 shown in region 600 are defined by the solid lines, while the sub-pixels 603 are defined by dotted lines. As can be seen by the grid labels to the left and above region 600, the pixels 602 in region 600 have pixel locations (left-most and upper-most coordinates) of 0,0 0,2 0,4 0,6 2,0 2,2 2,4, and so on, while the sub-pixels have pixel locations of 0,0 0,1 0,2 0,3 0,4 0,5 0,6 1,0 1,1, and so on.

Unsnapped primitive 604 is defined by vertices 608-1, 608-2, and 608-3, calculated by units upstream from rasterizer 455. Vertex 608-1 has a position of 2.6, 2.4, vertex 608-2 has a position of 7.4, 11.8, and vertex 608-3 has a position of 12.6, 7.4. When the viewport transform is applied, unsnapped primitive 604 is snapped to form snapped primitive 606. More specifically, the vertices 608 of unsnapped primitive 604 are snapped to the sub-pixels 603 of the grid.

Snapped primitive 606 is defined by vertices 610-1, 610-2, and 610-3. Vertex 610-1 has a position of 3,2, vertex 610-2 has a position of 7,12, and vertex 610-3 has a position of 13,7. As can be seen, "snapping" causes vertices 608 to be snapped such that the positions of snapped vertices 610 are the sub-pixel grid position nearest to the positions of unsnapped vertices 608. (For example, position 2.6, 2.4 snaps to 3, 2, 7.4, 11.8 snaps to 7, 12, and so on).

Referring to FIGS. 5 and 6A together, the resolution for region 500 is half of the resolution for region 600. Region 500 is an 8×8 area, while region 600 is a 16×16 area. Thus, the resolution for region 600 is twice the resolution for 500 in both horizontal and vertical directions. For any position in region 500, an equivalent "logical position" in region 600 is therefore determined by multiplying the coordinates of the position by two. Thus, for a position of 1,1 in region 500 the same logical position in region 600 would be 1×2, 1×2=2,2.

Unsnapped primitives 504 and 604 are in the same logical position in regions 500 and 600, respectively. Thus, all unsnapped vertices 508 for unsnapped primitive 504 are in the same logical positions as the unsnapped vertices 608 for unsnapped primitive 604. Specifically, unsnapped vertex 508-1, having a position of 1.3, 1.2 is in the same logical position as unsnapped vertex 508-2, which has a position of 2.6,2.4. As can be seen, the coordinates of unsnapped vertex 608-1 are double the coordinates of unsnapped vertex 508-1.

However, because the two resolutions are different, and thus the sub-pixel sizes are different, as can be seen, the snapped primitives 506 and 606 do not have vertices in the same logical positions. Specifically, snapped primitive 508 has snapped vertices 510-1, with position 1,1, 510-2, with position 4,6, and 510-3, with position 6,4, while snapped primitive 608 has snapped vertices 610-1, with position 3,2, 610-2, with position 7,12, and 610-3, with position 13,7. Vertex 610-1 is not in the same logical position as vertex 510-1, because vertex coordinates for vertex 610-1, which are 3,2, are not equal to 1,1×2. Similarly, vertex 610-2 is not in the same logical position as vertex 610-2, because vertex coordinates for vertex 610-2, which are 7,12 are not equal to 4,6×2. Finally, vertex 610-3 is not in the same logical position as vertex 610-3, because vertex coordinates for vertex 610-3, which are 13,7, are not equal to 6,4×2. The reason that the snapped vertices 610 are not in the same logical positions as snapped vertices 510 is that in region 500, sub-pixels to which unsnapped vertices 508 are snapped are four times as big as the sub-pixels to which unsnapped vertices 608 are snapped.

Thus, as can be seen, there are differences in logical positions of primitives rasterized at different resolutions as shown in FIGS. 5 and 6A. Thus if memory were to be allocated for rasterization of the high resolution snapped primitive 606 based on the results of rasterization of the low resolution snapped primitive 504, memory may be allocated incorrectly because rasterization results for the low resolution snapped primitive 504 do not necessarily align with those of the high resolution snapped primitive 604.

Figure 6B:
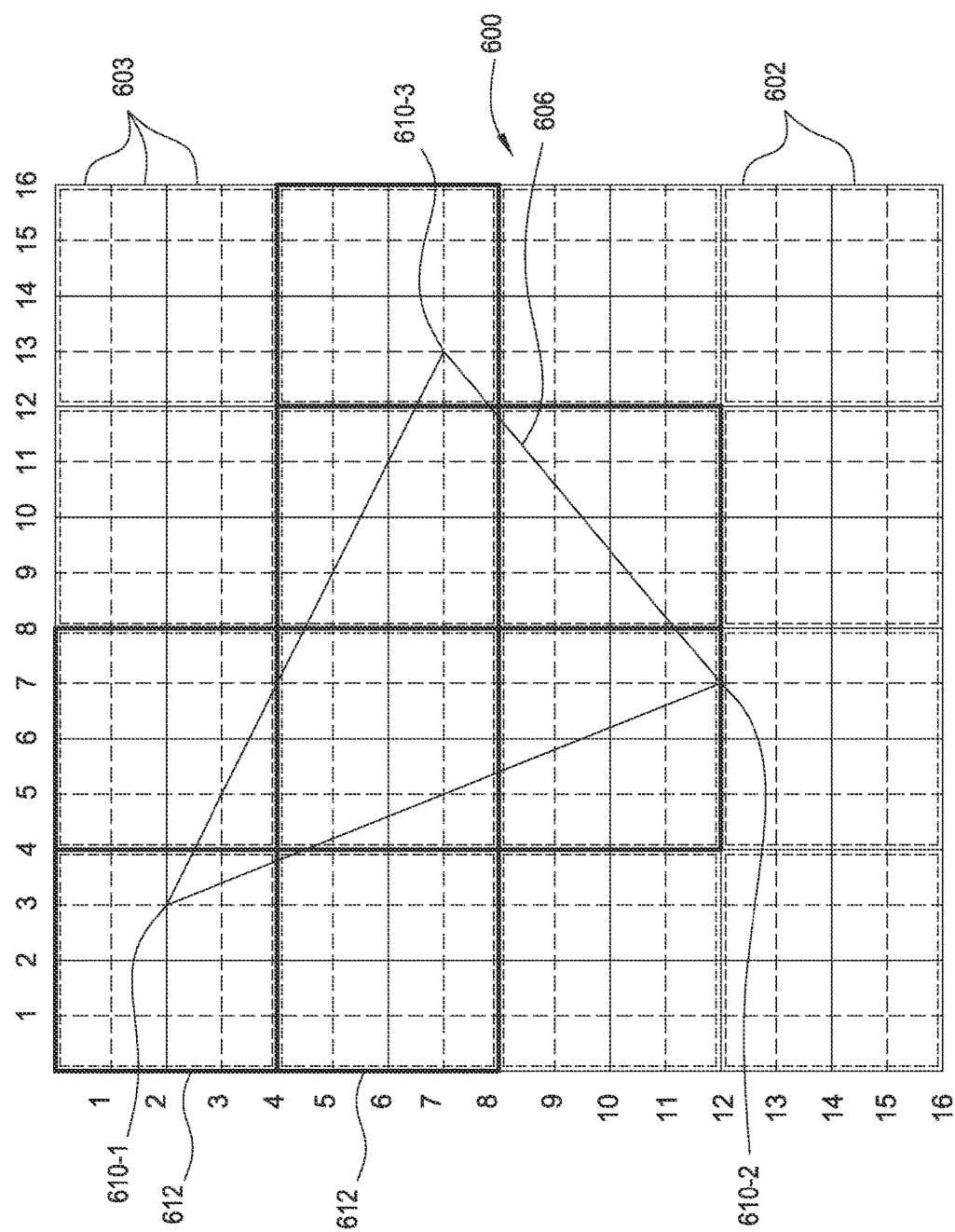
FIG. 6B illustrates an example of large pixel coverage for a primitive rasterized via multi-resolution consistent rasterization, according to one embodiment of the present invention.

FIG. 6B illustrates an example of large pixel coverage for a primitive rasterized via multi-resolution consistent rasterization in region 600 including a snapped primitive 606, and covered large pixels 612, according to one embodiment of the present invention. As shown, the region 600 includes universal pixels 602, sub-pixels 603, and snapped primitive 606. In region 600, universal pixels 602 are outlined with solid (non-bold) black lines. Sub-pixels 603 for the universal pixels 602 are outlined with dotted lines. Large pixels 612 are outlined with solid and dotted lines together. Each large pixel 612 includes four universal pixels 602. Snapped primitive 606 is the same primitive as the snapped primitive 606 shown in FIG. 6A, and thus has the same snapped vertices 610 as is shown in FIG. 6A. In FIG. 6B, snapped primitive 606 is rasterized at a low resolution with conservative rasterization. More specifically, every large pixel 612 that is touched by snapped primitive 606 is considered "covered" (shown in bold), while every large pixel 612 that is not touched by snapped primitive 606 is not considered covered. Thus, large pixels 612 at positions 0,0, 4,0, 0,4, 4,4, 8,4, 12,4, 4,8, and 8,8 are covered because snapped primitive 606 touches a part of those large pixels, while large pixels at positions 8,0, 12,0, 0,8, 12,8, 0,12, 4,12, 8,12, and 12,12 are not covered because primitive 606 does not touch any part of the large pixels.

In one embodiment, memory for storage of the coverage data for conservative rasterization of snapped primitive 606 in region 600 is allocated as a 4×4 element array, addressable from 0 to 3 in both horizontal and vertical directions. Coverage data for each large pixel 612 in region 600, occupies an element of the 4×4 element array. Further, the array is addressable by scaling down the pixel positions of the large pixels by the scaling factor, which is equal to the size of the large pixel divided by the "unit size" of the universal grid. The term "unit size" refers to the size of an element of the universal resolution that corresponds to one unit in length and width. In this case, the unit size is one half of a universal pixel in both horizontal and vertical directions. Thus, the scaling factor is 4 in both directions, and the addresses for storage of coverage data in the array can be determined by dividing the large pixel positions by 4 in both directions. Therefore, coverage data for large pixels, can be stored in array by dividing the corresponding large pixel locations by 4.

For example, for the large pixel 612 with position 8,4, the array position for storage of the coverage data is obtained by dividing 8 by 4 and by dividing 4 by 4, which results in an array position of 2,1. An array that stores all large pixel 612 coverage data for region 600 includes the following data, where 0 indicates that a large pixel 612 is not covered, and 1 indicates that a large pixel 612 is covered:
[1,1,0,0]
[1,1,1,1]
[0,1,1,0]
[0,0,0,0]

Figure 6C:
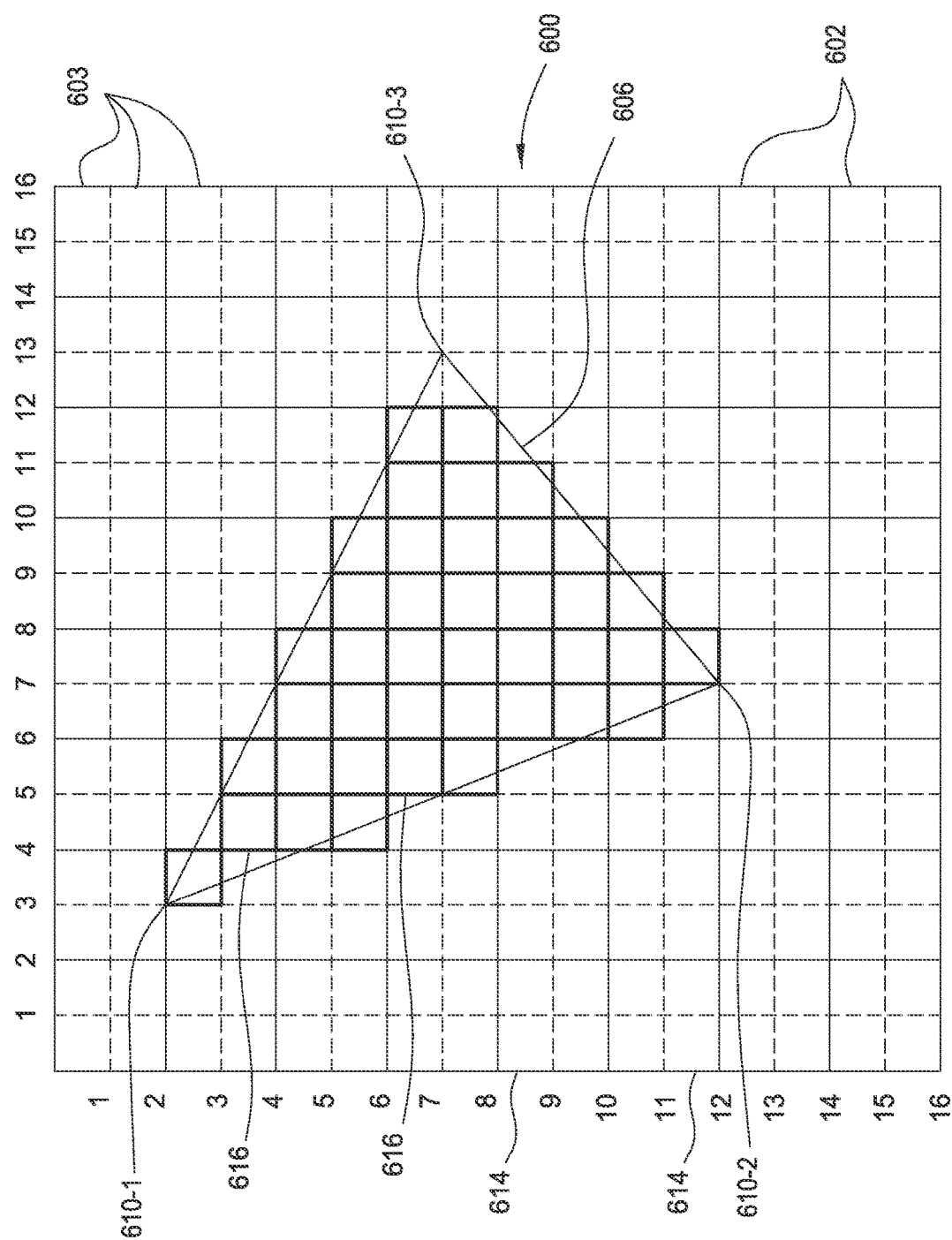
FIG. 6C illustrates an example of small pixel coverage for a primitive rasterized via multi-resolution consistent rasterization, according to one embodiment of the present invention.

FIG. 6C illustrates an example of small pixel coverage for a primitive rasterized via multi-resolution consistent rasterization in a region 600 including a snapped primitive 606, and covered small pixels 614, according to one embodiment of the present invention. As shown, the region 600 includes universal pixels 602, sub-pixels 603, and snapped primitive 606.

In region 600, universal pixels 602 are outlined with solid (non-bold) black lines. Sub-pixels 603 for the universal pixels 602 are outlined with dotted lines. Each small pixel 614 includes one universal pixel 602. Further, each small pixel 614 includes 4 sub-pixels 603. Snapped primitive 606 is the same primitive as the snapped primitive 606 shown in FIGS. 6A and 6B, and thus has the same snapped vertices 610 as is shown in FIGS. 6A and 6B. In FIG. 6C, snapped primitive 606 is rasterized at a high resolution with standard rasterization, with 4 sub-pixel samples. More specifically, every sub-pixel 603 in every small pixel 614 for which the center of the sub-pixel 603 is covered by snapped primitive 606 is considered "covered" (shown in bold), while sub-pixel 603 in every small pixel 614 for which the center of the sub-pixel 603 is not covered by snapped primitive 606 is considered "not-covered." Thus sub-pixels 603 at positions 3,2, 4,3, 5,3, 4,4, 5,4, 6,4, 7,4 as well as many others as shown, are covered because snapped primitive 606 touches the center of those sub-pixels 603, while sub-pixels at positions 0,0, 1,0, 2,0, 3,0, and so on, are not covered because snapped primitive 606 does not cover the center of the sub-pixels 603.

In one embodiment, sub-pixels 603 are only evaluated for coverage if the sub-pixels 603 lie within covered large pixels for the low resolution rasterization. To determine which sub-pixels 603 lie within covered large pixels, the memory addresses of covered large pixels are multiplied by the scaling factor, and an offset is added to the result. For example, for the large pixel 612 in FIG. 6B at address 1,1, the address is multiplied by the scaling factor of 4 to arrive at the position 4,4. Then, an offset is added for each sub-pixel 603 to be evaluated. Since there are 16 sub-pixels 603 in each large pixel 612, a different offset is added 16 times, once for each sub-pixel 603. Thus, offset 0,0 is added for the sub-pixel at 4,4, offset 1,0 is added for the sub-pixel at 5,4, and so on. An array that stores all sub-pixel 603 coverage data for region 600 includes the following data, where 0 indicates that a sub-pixel 612 is not covered, and 1 indicates that a sub-pixel 603 is covered:
[0,0,0,0,0,0,0,0,0,0,0,0,0,0,0,0]
[0,0,0,1,0,0,0,0,0,0,0,0,0,0,0,0]
[0,0,0,0,1,1,0,0,0,0,0,0,0,0,0,0]
[0,0,0,0,1,1,1,0,0,0,0,0,0,0,0,0]
[0,0,0,0,1,1,1,1,1,0,0,0,0,0,0,0]
[0,0,0,0,0,1,1,1,1,1,1,0,0,0,0,0]
[0,0,0,0,0,1,1,1,1,1,1,0,0,0,0,0]
[0,0,0,0,0,0,1,1,1,1,0,0,0,0,0,0]
[0,0,0,0,0,0,1,1,1,1,0,0,0,0,0,0]
[0,0,0,0,0,0,1,1,1,0,0,0,0,0,0,0]
[0,0,0,0,0,0,1,0,0,0,0,0,0,0,0,0]

Figure 7:
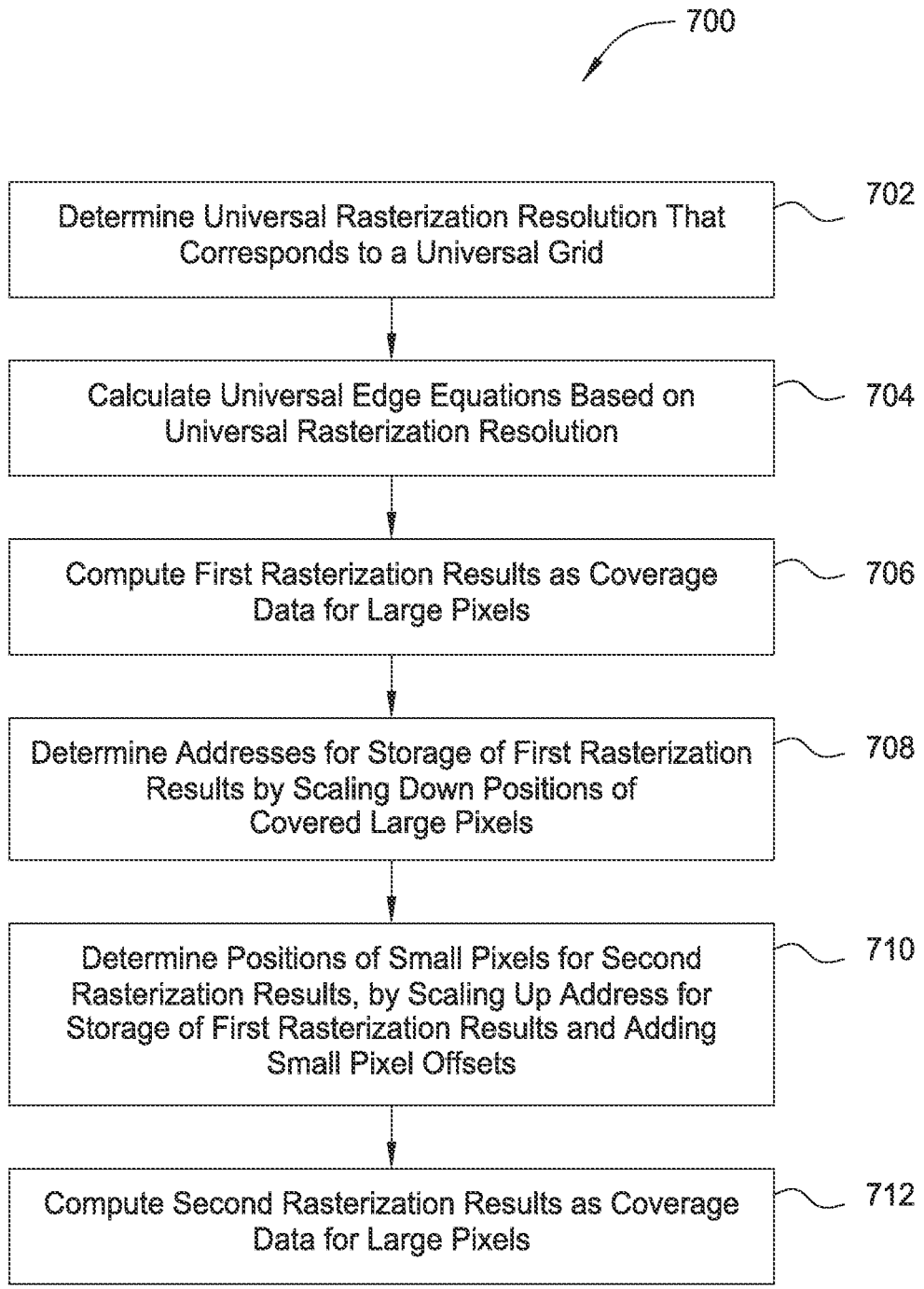
FIG. 7 is a flow diagram of method steps for performing multiresolution consistent rasterization, according to one embodiment of the present invention.

FIG. 7 is a flow diagram of method steps for performing multiresolution consistent rasterization, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 700 begins at step 702, where a setup unit within rasterizer 455 determines a universal resolution that corresponds to a universal grid. In step 704, the setup unit within the rasterizer 455 calculates universal edge equations based on the universal resolution. In step 706, rasterizer 455 computes first rasterization results as coverage data for large pixels. In step 708, rasterizer 455 determines addresses for storage of first rasterization results by scaling down the positions of the covered large pixels. In step 710, rasterizer 455 determines the positions of small pixels for second rasterization results by scaling up the addresses for the storage of the first rasterization results and adding small pixel offsets. Finally, in step 712, rasterizer 455 computes second rasterization results as coverage data for the small pixels.

In sum, a graphics processing pipeline is configured to calculate universal edge equations so that rasterizing graphics data at different resolutions produces consistent results. More specifically, a setup unit calculates universal edge equations based on data produced by the world-space stages of the graphics processing pipeline. A rasterizer then generates fixed-point rasterization results, such as coverage data for normal rasterization or coverage data for low-resolution conversative rasterization, that are aligned to the coordinates of a universal grid based on the universal edge equations. For low-resolution rasterization, the rasterizer evaluates the universal edge equations based on larger sized pixels; whereas, for high-resolution rasterization, the rasterizer evaluates the universal edge equations based on smaller sized pixels. Addresses for low resolution pixels are calculated by scaling down the results of the low-resolution rasterization by a scaling factor. Pixel positions for small pixels are calculated by multiplying the addresses for the low resolution pixels by a scaling factor and adding a small pixel offset.

One advantage of the disclosed techniques is that objects can be rasterized consistently at multiple resolutions. This consistency allows low-resolution rasterization to produce rasterization results that are more accurate and precise for subsequent rasterization at a higher resolution than prior art techniques. Techniques that rasterize across multiple resolutions are thus better able to utilize rasterization results for low-resolution rasterization to make certain decisions, such as how much memory to allocate, thereby improving memory usage, and increasing performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for rasterizing an object, comprising:
determining a universal resolution that corresponds to a universal grid;
applying a viewport transform to snap screen coordinates for vertices of the object to the universal resolution that is different from a first resolution associated with the object;
calculating, via a processor, universal edge equations based on the universal resolution and data that represent geometry data associated with the object; and
determining large pixel coverage data comprising a plurality of covered large pixels based on the universal edge equations and the first resolution.

2. The method of claim 1, further comprising determining small pixel coverage data comprising a plurality of covered small pixels, based on the universal edge equations, the plurality of covered large pixels, and a second resolution, wherein the second resolution is higher than the first resolution.

3. The method of claim 2, wherein determining the plurality of covered large pixels comprises evaluating coverage for a plurality of large pixels in the universal grid, and wherein determining the plurality of covered small pixels comprises evaluating coverage for a plurality of small pixels in the universal grid.

4. The method of claim 3, wherein evaluating coverage for the plurality of large pixels in the universal grid comprises, for each large pixel in the plurality of large pixels, determining whether the object covers any portion of the large pixel.

5. The method of claim 4, wherein evaluating coverage for the plurality of small pixels in the universal grid comprises, for each small pixel in the plurality of small pixels, determining whether the object covers a sample within the small pixel.

6. The method of claim 5, wherein each large pixel in the plurality of large pixels in the universal grid has a large pixel position, and further comprising, for each large pixel in the plurality of large pixels, determining addresses for storage of large pixel coverage data by dividing the large pixel position by the scaling factor.

7. The method of claim 6, wherein each small pixel in the plurality of small pixels in the universal grid has a small pixel position, and wherein evaluating coverage data for the plurality of small pixels further comprises, for each small pixel, determining a small pixel position by multiplying the address for storing the large pixel coverage data by the scaling factor and adding a small pixel offset.

8. The method of claim 7, wherein the scaling factor is based on a power of two, and wherein dividing the address for storing the large pixel coverage data further comprises bit-shifting the address for storing the large pixel coverage data by the base-two logarithm of the scaling factor.

9. The method of claim 7, wherein multiplying the address for storing the large pixel coverage data further comprises bit-shifting the address for storing the large pixel coverage data by the base-two logarithm of the scaling factor.

10. The method of claim 1, wherein the universal resolution is a lowest common multiple resolution of a low resolution and a high resolution for which the geometry data associated with the object is rasterized.

11. The method of claim 1, wherein the screen coordinates produced via the viewport transform represent positions of the vertices of the object on the universal grid.

12. The method of claim 1, wherein snapping the screen coordinates for the vertices of the object aligns the screen coordinates with a plurality of cells associated with the universal grid.

13. A graphics processing pipeline for rasterizing an object, comprising:
- a viewport scale, cull, and clip unit configured to apply a viewport transform to snap screen coordinates for vertices of the object to a universal resolution that is different from a first resolution associated with the object;
- a setup unit configured to calculate universal edge equations based on the universal resolution and data that represent geometry data associated with the object; and
- a rasterizer unit configured to determine large pixel coverage data comprising a plurality of covered large pixels based on the universal edge equations and the first resolution.

14. The graphics processing pipeline of claim 13, wherein the rasterizer unit is further configured to determine small pixel coverage data comprising a plurality of covered small pixels, based on the universal edge equations, the plurality of covered large pixels, and a second resolution, wherein the second resolution is higher than the first resolution.

15. The graphics processing pipeline of claim 14, wherein determining the plurality of covered large pixels comprises evaluating coverage for a plurality of large pixels in the universal grid, and wherein determining the plurality of covered small pixels comprises evaluating coverage for a plurality of small pixels in the universal grid.

16. The graphics processing pipeline of claim 15, wherein evaluating coverage for the plurality of large pixels in the universal grid comprises, for each large pixel in the plurality of large pixels, determining whether the object covers any portion of the large pixel.

17. The graphics processing pipeline of claim 16, wherein evaluating coverage for the plurality of small pixels in the universal grid comprises, for each small pixel in the plurality of small pixels, determining whether the object covers a sample within the small pixel.

18. The graphics processing pipeline of claim 17, wherein each large pixel in the plurality of large pixels in the universal grid has a large pixel position, and further comprising, for each large pixel in the plurality of large pixels, determining addresses for storage of large pixel coverage data by dividing the large pixel position by the scaling factor.

19. The graphics processing pipeline of claim 18, wherein each small pixel in the plurality of small pixels in the universal grid has a small pixel position, and wherein evaluating coverage data for the plurality of small pixels further comprises, for each small pixel, determining a small pixel position by multiplying the address for storage of the large pixel coverage data by the scaling factor and adding a small pixel offset.

20. The graphics processing pipeline of claim 19, wherein the scaling factor is based on a power of two, and wherein dividing the address for storing the large pixel coverage data further comprises bit-shifting the address for storing the large pixel coverage data by the base-two logarithm of the scaling factor.

21. The graphics processing pipeline of claim 19, wherein multiplying the address for storing the large pixel coverage data further comprises bit-shifting the address for storing the large pixel coverage data by the base-two logarithm of the scaling factor.

22. A computing device comprising:
- a graphics processing pipeline comprising:
  - a viewport scale, cull, and clip unit configured to:
    - receive an instruction to rasterize the object at two or more resolutions via a multiresolution consistent rasterization mode, and
    - apply a viewport transform to snap screen coordinates for vertices of the object to a universal resolution that is different from a first resolution associated with the object;
  - a setup unit configured to calculate universal edge equations based on the universal resolution and data that represent geometry data associated with the object; and
  - a rasterizer unit configured to determine large pixel coverage data comprising a plurality of covered large pixels based on the universal edge equations and the first resolution.

23. The computing device of claim 22, wherein the rasterizer unit is further configured to determine small pixel coverage data comprising a plurality of covered small pixels, based on the universal edge equations, the plurality of covered large pixels, and a second resolution, wherein the second resolution is higher than the first resolution.

* * * * *